(12) United States Patent
Miller et al.

(10) Patent No.: US 7,757,301 B2
(45) Date of Patent: Jul. 13, 2010

(54) SECURITY HARDENED DISC DRIVE

(75) Inventors: Michael Miller, Eden Prairie, MN (US); Zine-Eddine Boutaghou, North Oaks, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1239 days.

(21) Appl. No.: 11/018,651

(22) Filed: Dec. 21, 2004

(65) Prior Publication Data

US 2006/0136752 A1   Jun. 22, 2006

(51) Int. Cl.
G08B 13/00 (2006.01)
G08B 21/00 (2006.01)
G08B 29/00 (2006.01)
G06F 12/14 (2006.01)

(52) U.S. Cl. .................... 726/34; 726/35; 713/193; 713/194; 360/97.02; 360/137; 720/648; 720/719

(58) Field of Classification Search .................. 713/194, 713/193; 726/34, 35; 360/97.02, 137; 720/648, 720/719; 428/64.6
See application file for complete search history.

(56) References Cited

U.S. PATENT DOCUMENTS

| | | | |
|---|---|---|---|
| 4,942,831 A | 7/1990 | Tel | 109/29 |
| 5,315,656 A | 5/1994 | Devaux et al. | 380/23 |
| 5,422,766 A | 6/1995 | Hack et al. | 360/97.02 |
| 6,182,223 B1 | 1/2001 | Rawson | 713/200 |
| 6,205,845 B1 | 3/2001 | Dinsmore et al. | 73/37 |
| 6,292,898 B1 | 9/2001 | Sutherland | 713/200 |
| 6,470,449 B1 | 10/2002 | Blandford | 713/178 |
| 6,473,861 B1 | 10/2002 | Stokes | 713/193 |
| 6,683,747 B2 | 1/2004 | Bernett | 360/97.02 |
| 6,780,564 B2 * | 8/2004 | Lawandy et al. | 430/270.1 |
| 6,782,479 B1 | 8/2004 | Williams et al. | 713/194 |
| 6,789,192 B2 | 9/2004 | Hirota et al. | 713/172 |
| 7,099,110 B2 * | 8/2006 | Detzler | 360/97.02 |
| 2002/0002685 A1 * | 1/2002 | Shim | 713/200 |
| 2003/0007280 A1 | 1/2003 | Bernett et al. | 360/77.02 |
| 2003/0090832 A1 | 5/2003 | Bernett et al. | 360/97.02 |
| 2004/0093505 A1 | 5/2004 | Hatakeyama et al. | 713/189 |
| 2004/0103302 A1 * | 5/2004 | Yoshimura et al. | 713/200 |
| 2004/0250103 A1 * | 12/2004 | Yokosawa | 713/193 |
| 2005/0210278 A1 * | 9/2005 | Conklin et al. | 713/194 |
| 2006/0136752 A1 * | 6/2006 | Miller et al. | 713/194 |

OTHER PUBLICATIONS

Wikipedia.org. entry for "Ceric Ammonium Nitrate", retrieved Jul. 2008.*

* cited by examiner

*Primary Examiner*—Michael J Simitoski
(74) *Attorney, Agent, or Firm*—Kirk A. Cesari; Westman, Champlin & Kelly, P.A.

(57) ABSTRACT

A storage device assembly includes a sealed housing having a base and a cover. A storage medium is disposed within the sealed housing. A security feature within the housing is adapted to damage at least a portion of the storage medium if the sealed housing is opened.

6 Claims, 7 Drawing Sheets

SECURITY HARDENED DISC DRIVE

CROSS-REFERENCE TO RELATED APPLICATION

None.

FIELD OF THE INVENTION

The present invention relates generally to the field of data storage systems, and more particularly, to storage systems adapted to prohibit unauthorized access to the storage media.

BACKGROUND OF THE INVENTION

In recent years, more and more emphasis has been placed on data security. To protect information, most businesses have taken steps to protect individual server platforms, and some have taken steps to extend security features to individual workstations. Typically, such steps include data encryption, digital certificates, login user names and passwords, physical access keys, and the like.

Improvements to data security have lead to the introduction of hardened security features into storage systems, such as root keys for unlocking encryption/decryption keys, which may be stored on the storage device, for example. Unfortunately, most of the hardened security measures can be bypassed simply by gaining physical access to the storage device. For example, a disc drive assembly may be carefully disassembled and the rotatable discs can be removed and read using specialized equipment. Moreover, if the drive electronics are physically accessible, an individual could probe the electronics and gain access to protected data stored on the drive by stealing the access information (such as the encryption/decryption keys) from the electronics. For example, if the encryption electronics are physically accessible, there is a possibility that the stored information could be viewed in an unencrypted state by using specialized instrumentation to probe the electronics.

Conventionally, some systems have been configured to erase encryption/decryption keys stored, for example, in electrically erasable programmable read only memory (EEPROM). However, specialized eavesdropping equipment makes it possible to uncover data from storage media even after the data has been erased or overwritten. Similarly, data bits erased from programmable chips may be recoverable using specialized equipment.

There is an ongoing need for physical and logical disc security measures for protecting data from unauthorized access. Embodiments of the present invention provide solutions to these and other problems, and offer other advantages over the prior art.

SUMMARY OF THE INVENTION

A storage device assembly includes a sealed housing having a base and a cover. A storage medium is disposed within the sealed housing. A security feature within the housing is adapted to damage at least a portion of the storage medium if the sealed housing is opened.

In one embodiment, a storage device includes a sealed housing, a storage medium disposed within the housing, and a mechanism coupled to the storage medium. The mechanism is adapted to destroy data stored on the storage medium in response to a triggering event.

In another embodiment, a storage system has a sealed housing, a storage medium disposed within the housing, and a security feature within the housing for damaging the storage medium in response to a triggering event.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
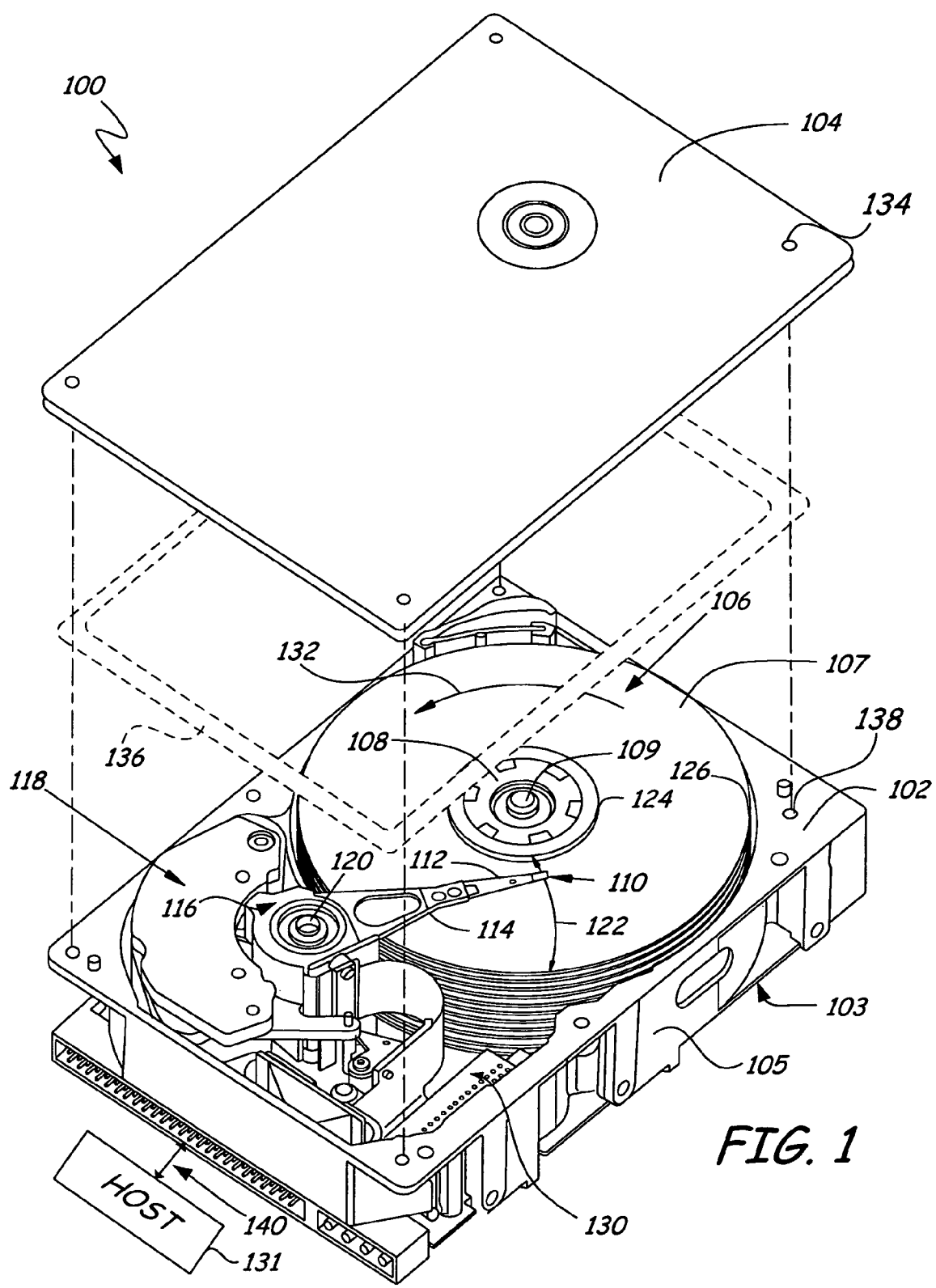
FIG. 1 is an isometric view of a disc drive.

FIG. 1 is an isometric view of a disc drive 100 in which embodiments of the present invention are useful. Disc drive 100 includes a housing with a base portion 102 and a cover 104. The base portion 102 typically includes a base 103 and side walls 105 defining a chamber with an opening, which the cover 104 is sized to fit. Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110, which is mounted to disc drive 100 for communication with the disc surface to read and write data.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position read/write heads disposed on sliders 110 over a desired data track along an arcuate path 122 between a disc inner diameter 124 and a disc outer diameter 126. Voice coil motor 118 is driven by servo electronics 130 based on signals generated by read/write heads disposed on the sliders 110 and a host computer 131, which is coupled to the disc drive by interface 140.

During operation, as discs 107 rotate in a rotational direction 132, the discs 107 drag air (or whatever gas is sealed within the housing) under the respective sliders 110 and along their air (or other gas) bearing surfaces. As the air passes beneath the air bearing surfaces, air compression along the airflow path causes the air pressure between the discs 107 and the air bearing surfaces to increase, which creates an aerodynamic lifting force that counteracts the load force provided by actuator mechanism 116 and causes the sliders 110 to lift and fly above, but in close proximity to the disc surfaces.

A seal 136 is disposed between the base 102 and the cover 104 to isolate the contents of the disc drive 100 from the ambient environment. Fastener elements (reference numeral 142 in FIG. 2) may be extended through openings 134 provided in the cover 104 and into a corresponding opening 138 in the base 102 to fixedly attach the cover 104 to the base portion 102. In some embodiments, the fastener elements 142 may impart a compression force on the seal 136. In one embodiment, the seal 136 is adapted to maintain a disc drive environment comprised of a gas other than air. In another embodiment, the seal 136 is adapted to dispel contaminants onto the discs 107, the servo motor 118, the electronics 130 and the other contents of the disc drive 100 if the seal 136 is broken, thereby damaging the storage media and rendering information stored on the discs 107 inaccessible.

Typically, the disc drive 100 is coupled to a host system 131, such as a computer, over an interface 140. The host system 131 transmits commands and data over the interface 140 for storage on a magnetic disc 107. Additionally, data is received by the host system 131 over the interface 140 from the disc drive 100. The interface 140 generally refers to the coupling connection and associated circuitry for establishing a communications link between the host system 131 and the disc drive 100.

While FIG. 1 illustrates one manner of actuating a data head proximate a data storage medium, the present invention, however, is applicable to data storage systems that use other techniques as well.

Figure 2:
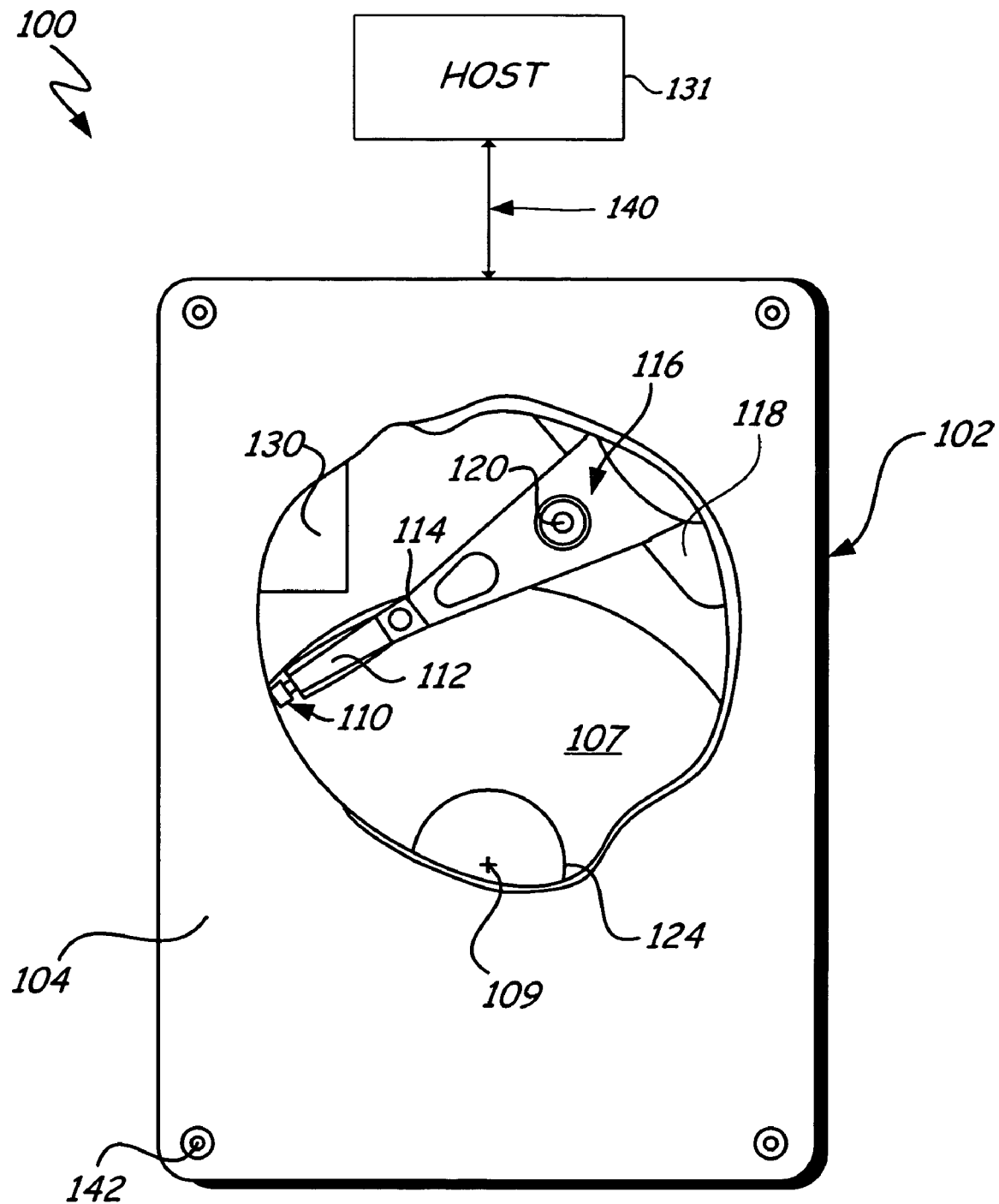
FIG. 2 is a simplified top view of the disc drive of FIG. 1 with a cover in place and a section cut out of the cover to expose some of the drive's contents.

FIG. 2 illustrates a top view of the disc drive system 100 with the cover 104 in place and with a section cut out to make a simplified view of the drive contents visible. The housing includes a base 102 and a cover 104. The cover 104 is fastened to the base 102 via fasteners 142. The fasteners may be rivets, threaded screws or bolts, or any other fastener capable of fixing the cover 104 to the base portion 102.

Within the disc drive 100, disc 107, which in this instance is the top disc of disc pack 108 (shown in FIG. 1), is mounted to a spindle motor (not shown) for rotating about central axis 109. Each disc surface of the disc pack has an associated disc head slider 110. Disc head slider 110, which is associated with disc 107, is mounted to disc drive 100 for communication with the disc surface. The slider 110 is supported by suspension 112 which in turn is attached to track accessing arm 114 of actuator 116. As in FIG. 1, the actuator shown in FIG. 2 is of the type known as a rotary moving coil actuator and includes a voice coil motor (VCM), shown generally at 118. Voice coil motor 118 is driven by servo electronics 130 based on signals generated by heads 110 and a host computer 131. The host computer 131 communicates with the disc drive 100 over interface 140.

Hard disc drives consist of both electrical and mechanical elements, and the housing of the disc drive 100 (comprised of base 102 and cover 104) is sealed to prevent contamination of magnetic heads and the storage medium. Breaking this seal can introduce particulate matter into the hard disc 100 that will compromise the head/media interface rendering the stored data unreadable. The systems and methods of the present invention take advantage of the physical vulnerability of the head/media interface to passively or actively damage the head/media interface if the seal between the cover and the base is broken.

Security vulnerabilities due to access to the encryption electronics by specialized electronic equipment can be mitigated by locating part of the electronic inside the sealed disc drive 100 and by providing a mechanism for damaging the head/disc interface in the event that the seal is broken or compromised.

Figure 3:
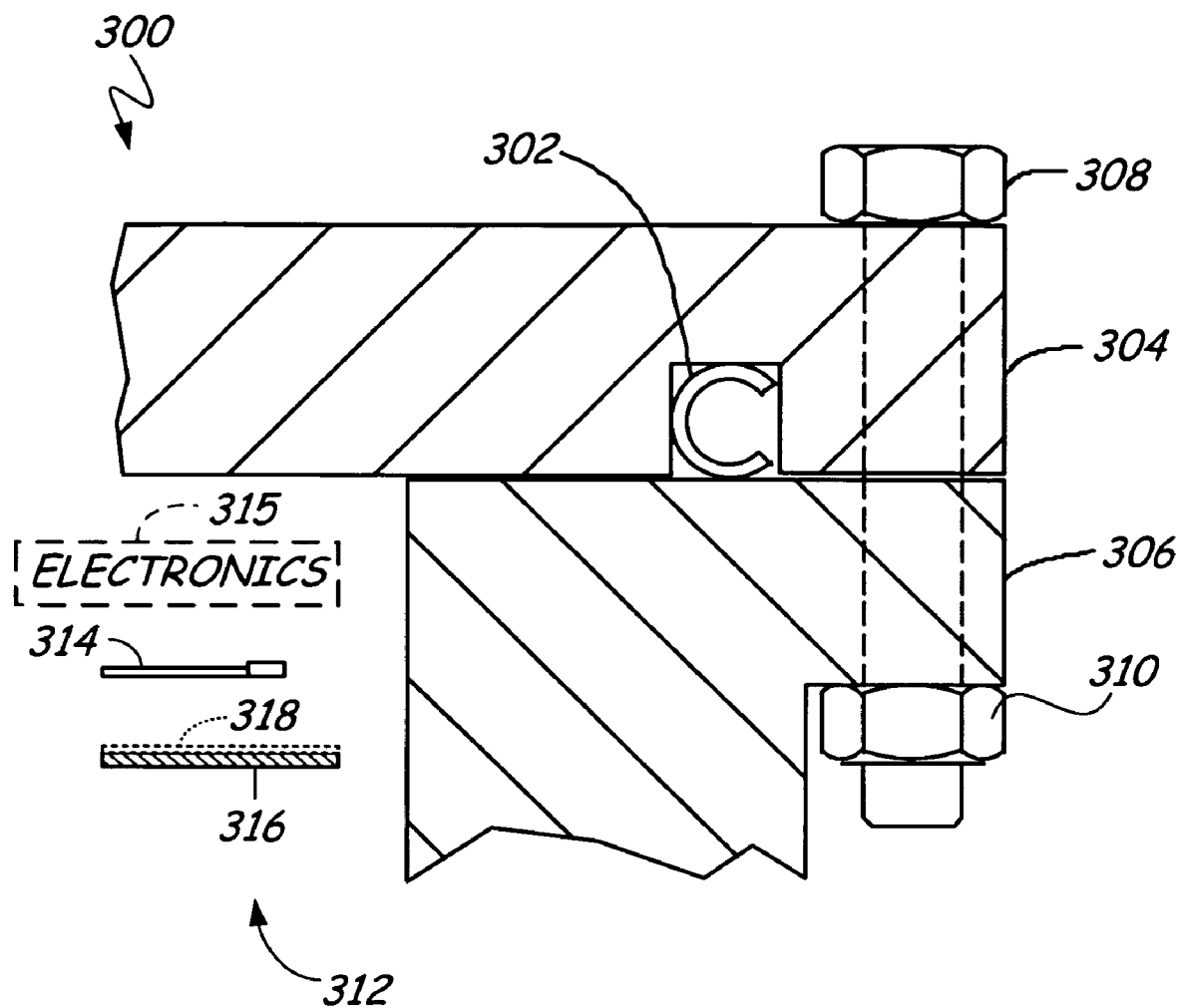
FIG. 3 is a simplified cross-sectional view of a housing with a C-seal according to an embodiment of the present invention.

FIG. 3 illustrates a metal C-seal 302 between a cover 304 and a base portion 306 of a storage device assembly 300 according to an embodiment of the present invention. The C-seal 302 is clamped between the cover 304 and the base portion 306 by a fastener 308 (a bolt in this instance) with a coupling nut 310. The cover 304 and base portion 306 define a chamber 312, which hosts a read/write mechanism 314 (and associated electronics and circuitry 315) and a storage medium 316.

In one embodiment, the chamber 312 is filled with a gas other than air. Depending on the implementation, a large clamping or compression force may be required to maintain an atmospheric seal using the C-seal 302, sealing the chamber 312 from the ambient environment. In one embodiment, a compression force of approximately 150 pounds force per running inch of the C-seal 302 was required to seal the assembly 300. The high forces can be generated by the bolted interface, and the seal may be perfected by elastic and inelastic deformation of the C-seal 302, which may be formed from Inconel and Stainless Steel. The compression force causes the coating of the C-seal 302, such as tin or other soft material, to flow into the surface imperfections of the mating surface to complete the seal. Thus, the seal 302 makes it possible to evacuate the housing environment and to fill the housing with a lower density, inert gas, such as helium. The head sliders and the control circuitry of the read/write mechanism 314 can be adapted to operate in the lower density gas. If the seal 302 of the assembly 300 is broken, the inert gas escapes, and the sliders and associated control circuitry no longer function correctly, thereby making the data stored on the storage medium 316 difficult to access.

In another embodiment, the storage medium 316 is coated with a chemical layer 318, which reacts violently when exposed to air. The violent reaction between air and the chemical layer 318 can damage the storage medium 316 and render the information stored on the storage medium 316 inaccessible. For example, the chemical layer 318 may be formed from any chemical that reacts violently with oxygen (via an oxidation reduction reaction for example) in the ambient environment, including phosphorous, aluminum, sodium, potassium, and the like, provided the selected chemical does not adversely effect the recording medium in the absence of oxygen. Thus, as long as the seal is maintained, the storage device 300 operates normally, but if the seal is broken and oxygen flows into the chamber 312, the storage medium 316 is destroyed.

Figure 4:
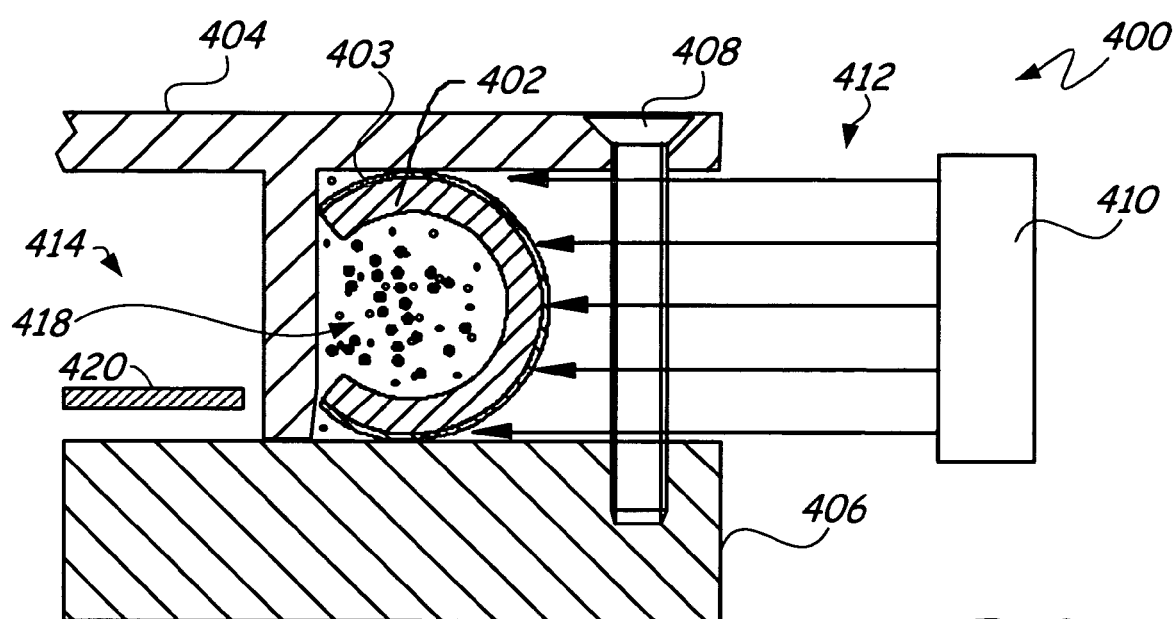
FIG. 4 is a simplified cross-sectional view of a housing with a contaminant filled seal according to embodiments of the present invention.

FIG. 4 illustrates an alternative embodiment of a seal 402 between a cover 404 and a base portion 406 of a housing 400 according to an embodiment of the present invention. Seal 402 (sometimes referred to as a C-seal or a spring seal) has an outer layer or coating layer 403 formed from a soft material, which is deformable by heat and/or compression to seal against deformities in the inside surface of the cover 404 and the base portion 406.

A fastener 408 extends through the cover 404 and into the base portion 406 to fixedly attach the cover to the base portion 406. A heat source 410 may direct heat (indicated by arrows 412) toward exposed areas on the seal 402 (in particular toward the outer layer 403 of the seal 402) to facilitate the deformation. In this embodiment, the fastener 408 need not impart the same level of force as indicated with respect to the embodiment of FIG. 3, in part, because heat is utilized to deform the coating layer 403.

In one embodiment, the seal 402 may be utilized to maintain a sealed atmosphere within the housing 400, such as described with respect to FIG. 3. Alternatively, the seal 402 may be filled with contaminant material 418 to damage the storage medium or any of the sensitive electronic components upon breaking of the seal. In this embodiment, the cover 404 has an extension between the seal 402 and the inner atmosphere 414 and which contacts the base portion 406. The contact area between the extension and the base portion 406 prevents undesirable contamination by the contaminant material 418, unless the cover 404 is removed. Removal of the cover 404 causes the seal 402 to release the contaminants 418, thereby damaging the storage medium 420. =The contaminant material 418 may be a particulate material having sharp edges for scratching and otherwise marring the storage medium 420. Alternatively, the contaminant material 418 is a ferromagnetic material, such as iron filings, which disperse and damage the storage medium 420. The contaminant material 418 may be an electrically or magnetically charged material, a conductive material, or an insulative material selected to interfere with attempts to read data from the storage medium 420. The contaminant material 418 alternatively may be a dye, paint or other material adapted to coat and thereby damage the storage medium 420. In a preferred embodiment, the contaminant material 418 is a corrosive material, such as Acetone, Hydrochloric acid, Methyl Ethyl Ketone (MEK), and the like. When the contents of the seal are acidic, it may be necessary to utilize a glass or ceramic seal, so that the contaminants 418 do not corrode the seal 402 from the inside. Alternatively, the contaminant material 418 may be a reactive chemical (such as phosphorous, aluminum, sodium, potassium, and the like). If the seal is broken, the contaminants 418 damage the storage medium 420, and may cause damage to the electronics as well, thereby rendering the data inaccessible.

Figure 5A:
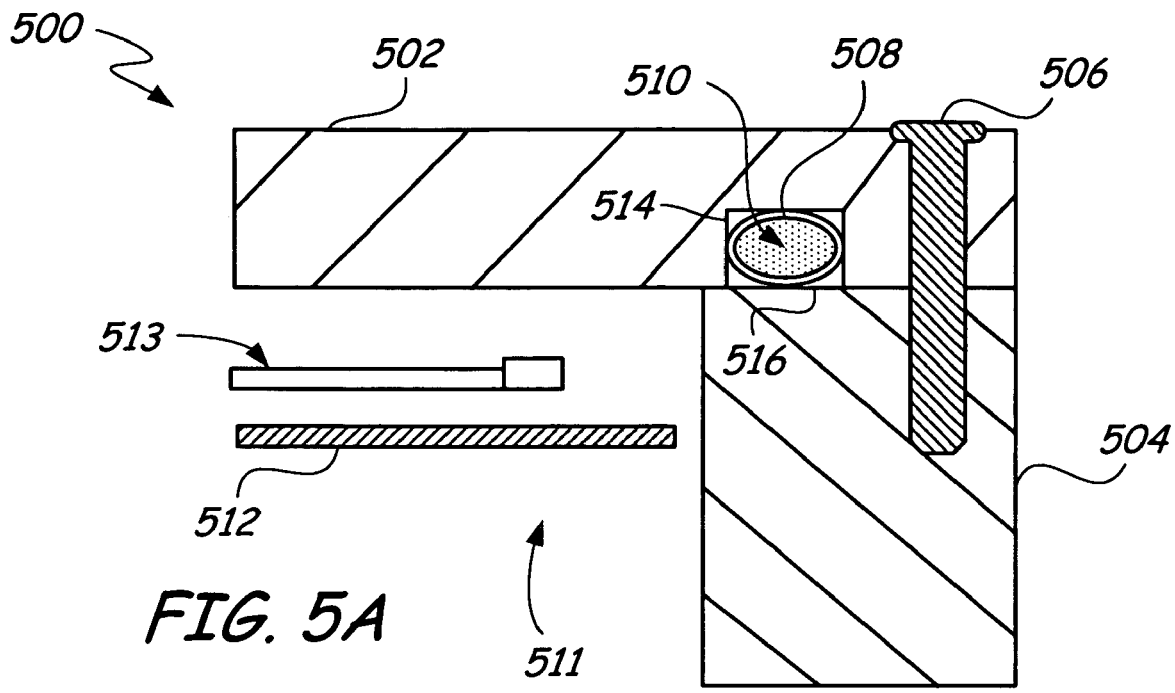
FIGS. 5A and 5B are simplified cross-sectional views of a housing with a seal (in a sealed and an open state, respectively) according to an embodiment of the present invention.

FIG. 5A illustrates an alternative embodiment of a contaminant filled seal disposed between a cover 502 and a base 504 of a housing 500 according to an embodiment of the present invention. The cover 502 and the base 504 are fixedly attached by fastener 506, which extends through the cover 502 and into the base portion 504. The housing 500 defines a chamber 511, in which a storage medium 512 and a read/write mechanism 513 (and associated electronics) are disposed. The read/write mechanism 513 is coupled to the storage medium 512 and adapted to read and to write data to and from the storage medium 512.

A seal 508 is positioned in a recess 514 provided in the cover 502. The seal 508 is sized to fit substantially within the recess 514 and to mate with a surface 516 of the base portion 504. The seal 508 has a hollow body defining a cavity 510 (sometimes referred to as a "lumen" within a tube-like seal), in which contaminants maybe disposed. In one embodiment, the seal 508 is heated to cause the seal 508 to bond with the surface 516 and the recess 514.

Figure 5B:
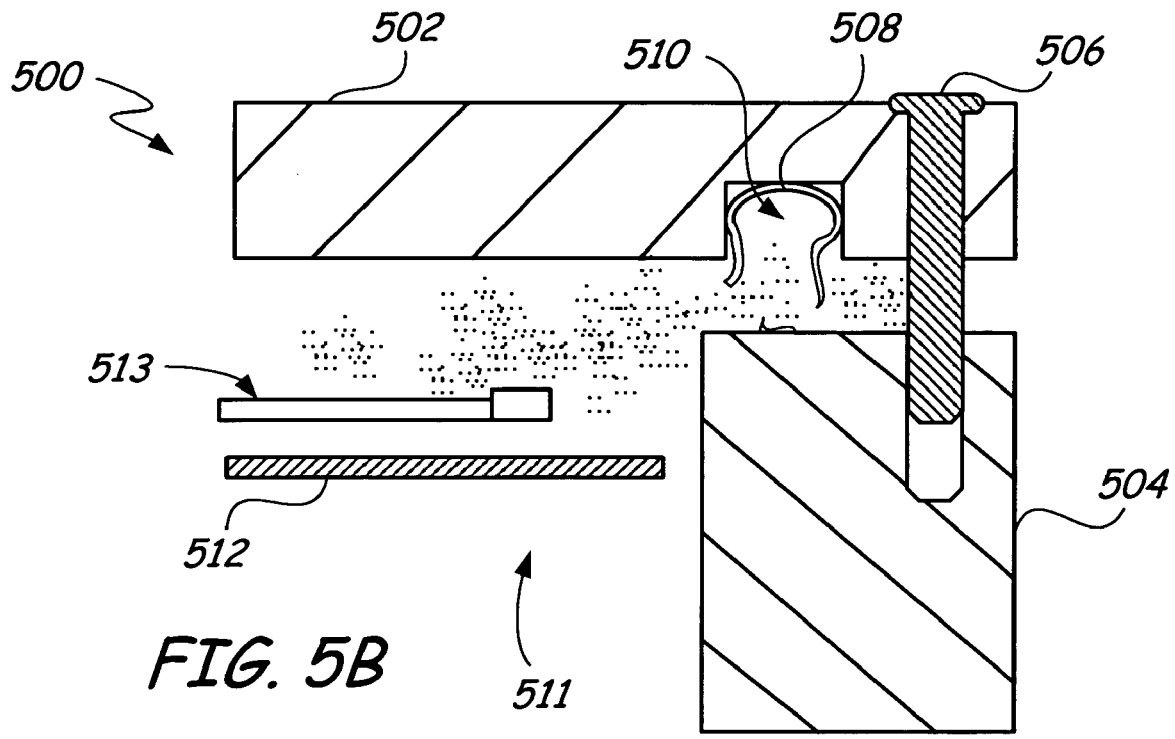

FIG. 5B illustrates the housing 500 of FIG. 5A wherein the cover 502 has been separated from the base portion 504. Removing the cover 502 causes the seal body 508 to tear open and release the contaminants onto, for example, the storage medium 512 and the read/write mechanism 513 (and associated electronics) disposed within the chamber 511 of the housing 500.

Figure 6:
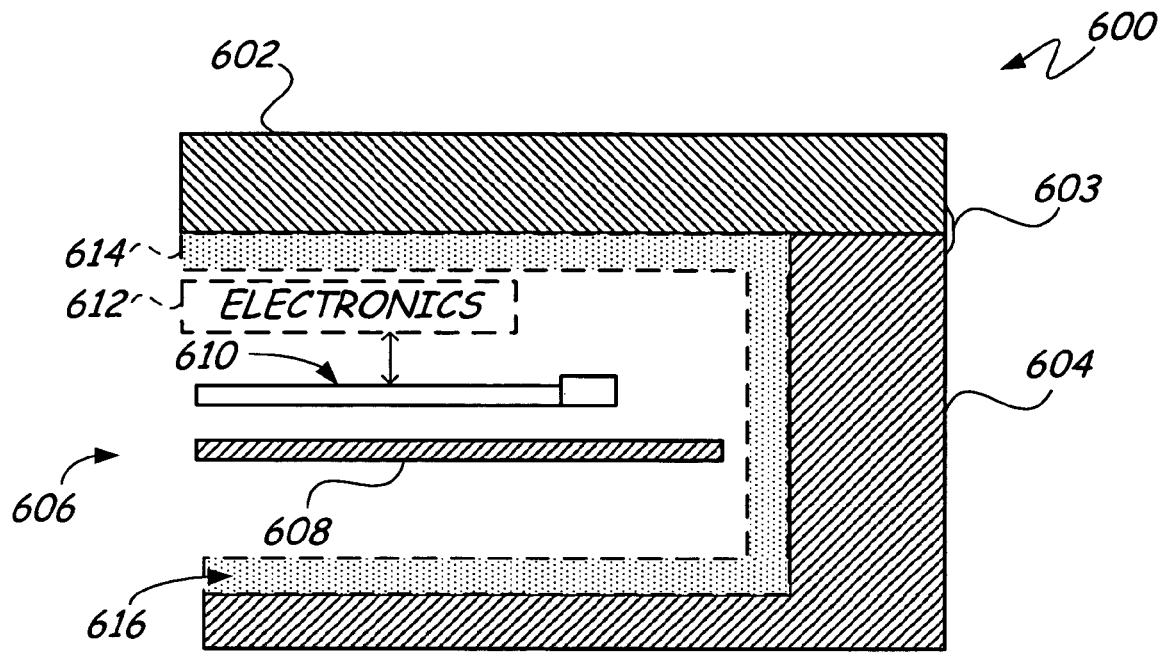
FIG. 6 is a simplified cross-sectional view of a seal arrangement according to an embodiment of the present invention.

In FIG. 6, an alternative contaminant-filled seal arrangement is shown, according to an embodiment of the present invention. A storage device housing 600 includes a cover 602 attached via a weld joint 603 to base portion 604. The housing 600 defines a chamber 606 within which a storage medium 608, read/write mechanism 610 and other electronics 612 may be disposed. A contaminant-filled element 614 lines an entire inside surface of the housing 600. The contaminant-filled element 608 is filled with a contaminant 616, such as ferro-magnetic material, acid, or any other material selected to damage the storage medium 608 and/or the electronics 612, if the element 614 is broken via a physical attack to the housing 600. Because the housing 600 is welded shut via weld joint 603, an attacker would likely need to cut the housing open, which would likely cut or tear the contaminant-filled element 614 and release the contaminants into the chamber 606.

Figure 7:
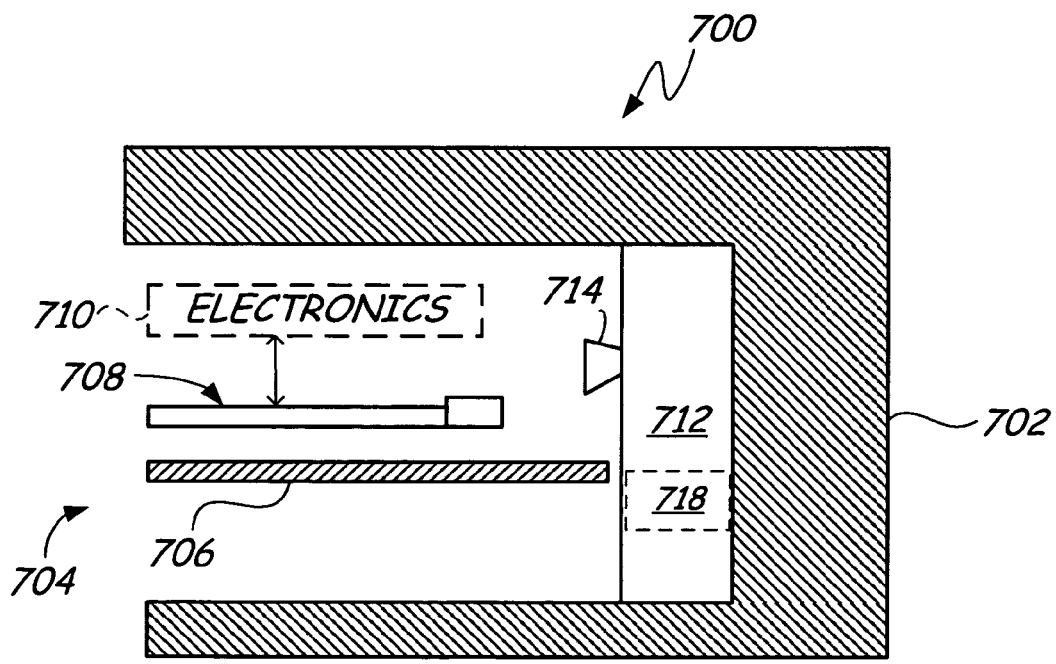
FIG. 7 is a simplified cross-sectional view of a housing with a mechanism for dispersing contaminants according to an embodiment of the present invention.

FIG. 7 illustrates a system 700 for propelling a contaminant within a storage device housing 702. The housing 702 defines a chamber 704 in which a storage medium 706, a read/write mechanism 708, and associated electronics 710 are disposed. The chamber 704 also includes a mechanism 712 adapted to detect an open state of the housing 702 and to disperse a contaminant if the housing 702 is opened. The mechanism 712 may be, for example, a pressurized canister with a nozzle 714 adapted to dispel contaminants via the nozzle 714 onto the storage medium 706 and/or the electronics 710 if the housing 702 is opened. In one embodiment, the mechanism 712 includes a pressure sensor 718 adapted to detect an abrupt change in a sealed atmosphere of the chamber 704, such that if the atmosphere of the chamber 704 changes beyond a threshold value, the mechanism 712 discharges the contaminant via the nozzle 714 onto the storage medium 706 and electronics 710.

Figure 8:
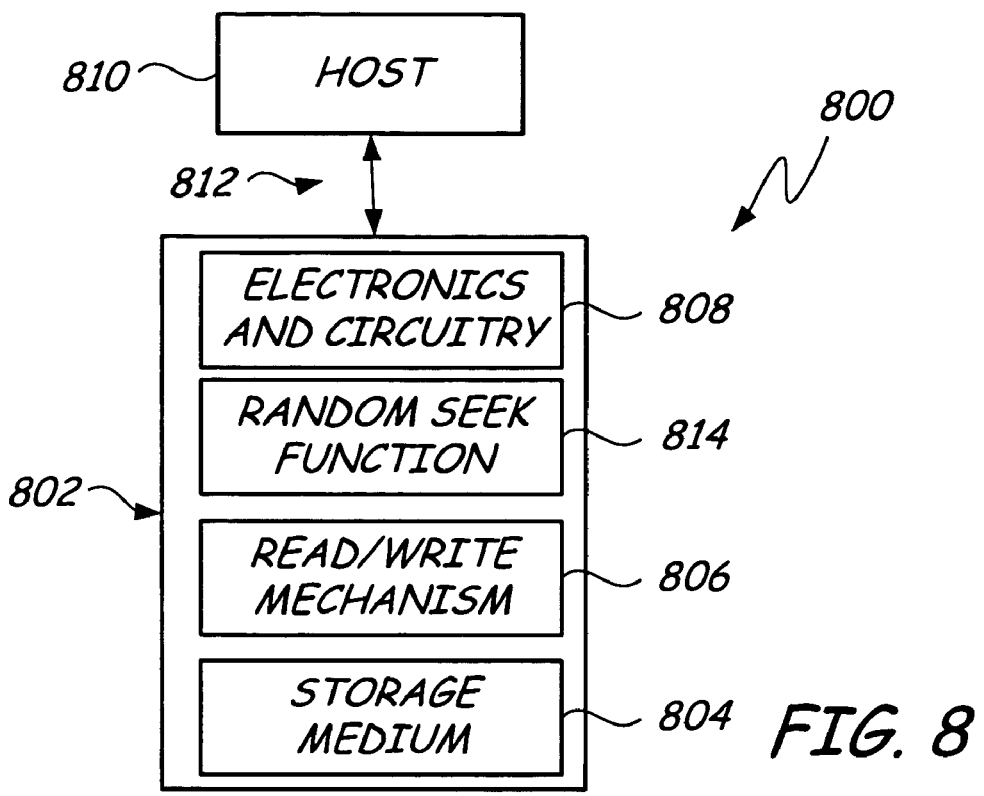
FIG. 8 is a simplified block diagram of a security hardened storage system with a mechanism that is adapted to destroy data on a storage media based on a command received over an interface according to an embodiment of the present invention.

FIG. 8 is a simplified block diagram of a security hardened storage system 800 according to an embodiment of the present invention. The security hardened storage system 800 includes a sealed housing 802, which defines a chamber for containing a storage medium 804, a read/write mechanism 806, and associated electronics and circuitry 808. The read/write mechanism 806 is coupled to the storage medium 810 and adapted to read and write information to and from the storage medium 804. The circuitry and electronics 808 are coupled to and adapted to control the read/write mechanism 806. The storage system 800 may be coupled to a host system 810 by an interface 812. In general, the security hardened storage system 800 may be any type of storage device, including a disc drive system, a flash memory system, or any other storage device 800 that stores data and communicatively couples to a host system 810 over an interface 812. The read/write mechanism 806 is provided with a random seek function 814 (shown in phantom), which causes the read/write mechanism 806 to sweep randomly over data tracks of the storage medium 804.

The electronics and circuitry 808 are adapted to receive a data destruction command via interface 812 from an authorized source (such as by an administrator). In response to an authorized destruction command received from the interface, the electronics and circuitry 808 energize a magnetic read/write head (enabling a write capability of the read/write head) of the read/write mechanism 806 and trigger the random seek function 814, thereby causing the read/write mechanism to sweep back and forth randomly over the storage medium while the read/write head is energized. This procedure results in a random write operation which randomly overwrites data on the storage medium, thereby destroying the data. In a storage device such as that shown in FIGS. 1 and 2, the magnetic write field of the read/write heads disposed on sliders 110 at the end of the actuator arms 114 are active while the discs 107 are rotated along path 132 and while the actuator arms 114 move back and forth randomly (along arcuate path 122) across the tracks of the discs 107. This would randomly overwrite data on the storage device, and may render the data unusable.

In the embodiment of FIG. 8, for example, a user may be required to log in to the storage device 800 as an administrator (or other role having destruction authorization). The electronics and circuitry 808 may be adapted to authenticate the user before accepting a destruction command via the interface 812. In one embodiment, the authentication may be provided via a user name and password logon. In a second embodiment, the authentication may be provided by fingerprint, retinal scan, smart card, or other type of physical identifier. Once the user is authenticated, a destruction command may be sent to the storage device 800, which causes, for example, the storage device 800 to enable a write-field of the read/write head and to perform a random seek operation with the write enabled.

Figure 9:
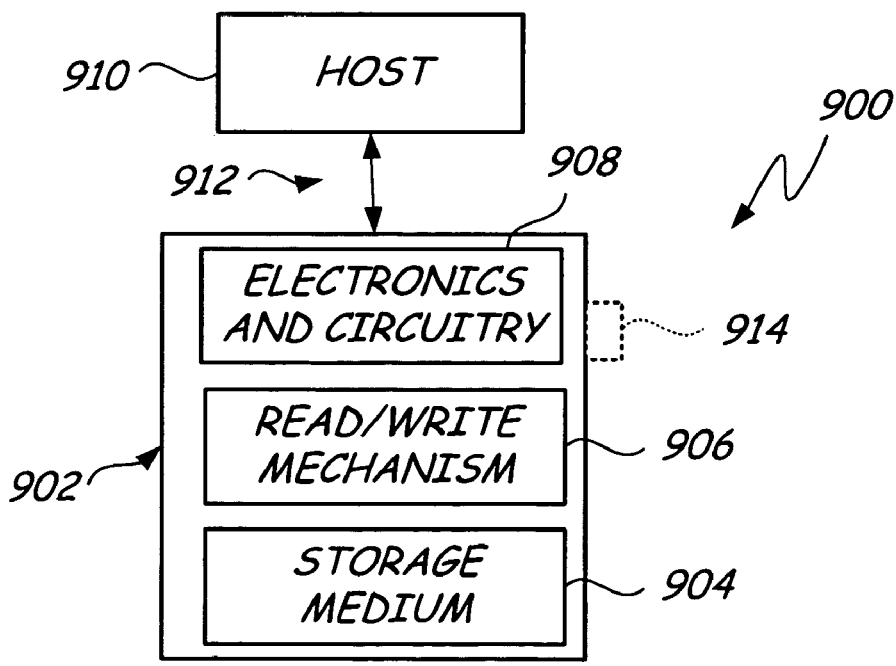
FIG. 9 is an alternative embodiment of a security hardened storage device with a physical switch for triggering physical destruction or alteration of data stored on the storage media according to an embodiment of the present invention.

FIG. 9 is an alternative embodiment of a security hardened storage device 900 according to an embodiment of the present invention. The security hardened storage device 900 includes a housing 902, which defines a chamber sized to hold a storage medium 904, a read/write mechanism 906, and electronics and circuitry 908. The read/write mechanism 906 is coupled to the storage medium 904 and adapted to read and write information to and from the storage medium 904. The electronics and circuitry 908 are coupled to and adapted to control the read/write mechanism 906. The storage device 900 may be coupled to a host system 910 via an interface 912. A trigger mechanism 914, which may be switch or push button is disposed on the housing 902 and adapted to trigger data destruction within the storage device 900 if triggered.

In one embodiment, the housing 902 is filled with an inert gas having lower density than air, and the storage medium 904 is coated with a oxygen-reactive layer (such as Potassium, Aluminum, and the like). When the trigger mechanism 914 is actuated, oxygen is released into the chamber containing the coated storage medium 904, thereby damaging the storage medium.

Alternatively, the trigger mechanism 914 may activate an electronics feature (such as the random seek with write enabled feature described with respect to FIG. 8) for damaging data stored on the storage medium 904. Finally, the trigger mechanism 914 may be utilized to activate a canister filled with contaminants (such as element 712 in FIG. 7), thereby spraying or otherwise dispelling contaminants onto the storage medium 904.

Finally, it should be appreciated that in some instances, the mechanism for destroying data (be it a magnetic coil, a mechanism for directing destructive material onto the magnetic discs, an actuating mechanism, or any other element adapted to trigger or effect destruction of data on the storage media) may require power. For example, it may be desirable to provide for situations where the power may be shut off to the storage device 900, but where destruction of the data or storage device may still be desirable. In such instances, a rechargeable battery 916 (shown in phantom) may be provided within the storage device 900 for maintaining a charge sufficient to perform the desired data destruction. The rechargeable battery 916 can maintain a ready charge by drawing power from a storage device power supply or from the interface 912 during normal operation.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the hardened security storage system while maintaining substantially the same functionality without departing from the scope and spirit of the present invention. In addition, although the preferred embodiment described herein is directed to a sealed enclosure for a storage device system for providing hardened security against physical attacks, it will be appreciated by those skilled in the art that the teachings of the present invention can be applied to any device having an enclosure containing sensitive mechanical or electronic components, without departing from the scope and spirit of the present invention.

What is claimed is:

1. A data storage device comprising:
   side walls, a base, and a cover forming an enclosure for the data storage device;
   a data storage medium disposed within the enclosure; and
   a seal comprising a cavity, the cavity isolated from the enclosure and an ambient environment by the base and the cover and
   filled with a contaminant material for damaging at least a portion of the data storage medium by releasing the contaminant material into the enclosure when the enclosure is opened by separation of the base and cover.

2. The assembly of claim 1, wherein the contaminant material comprises a corrosive material.

3. The assembly of claim 1, wherein the contaminant material comprises a ferromagnetic material.

4. The assembly of claim 1, wherein the contaminant material comprises a dye.

5. A data storage device comprising:
   an enclosure for the data storage device formed from at least a base and a cover;
   a data storage medium disposed inside the enclosure; and
   a hollow seal comprising a cavity, the hollow seal isolated from the enclosure and ambient environment by the cover and the base, the cavity filled with a contaminant material for damaging at least a portion of the data storage medium by releasing the contaminant material into the enclosure in response to separation of the cover from the enclosure.

6. The storage device of claim 5, wherein the hollow seal is adapted to tear open in response to separation of the cover from the enclosure.

* * * * *